3,464,979
PRO-OESTROGENIC STEROIDS NON-AROMATIC
IN RING A
Derek Harold Richard Barton, London, England, assignor to Research Institute for Medicine and Chemistry, Inc., Cambridge, Mass., a corporation of Massachusetts
No Drawing. Filed Apr. 1, 1965, Ser. No. 444,834
Claims priority, application Great Britain, Apr. 7, 1964, 14,317/64; Nov. 10, 1964, 45,811/64
Int. Cl. C07c 173/00, 169/10; A61k 17/00
U.S. Cl. 260—239.55
9 Claims

ABSTRACT OF THE DISCLOSURE

Pro-oestrogenic steroids having one of the partial structures:

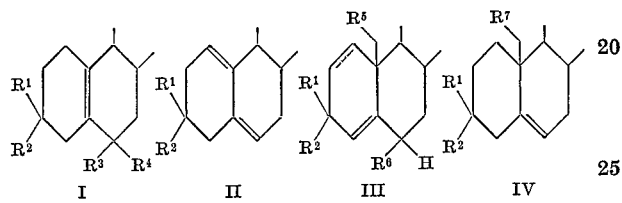

wherein $R^1$ is hydroxy or acyloxy and $R^2$ is hydrogen or $R^1$ and $R^2$ together are keto; $R^3$ is hydrogen, $\beta$-hydroxy, $\beta$-acyloxy, $\alpha$-halogen or $\beta$-halogen and $R^4$ is hydrogen or $R^3$ and $R^4$ together are keto; $R^5$ is hydrogen, hydroxy or acyloxy and $R^6$ is hydrogen or $R^5$ and $R^6$ together form an oxide or lactone bridge; the broken line indicates a carbon-carbon bond which may be present, there being no oxido bridge when there is a 1(2) double bond and a 17-keto substituent; and $R^7$ is hydroxy, acyloxy or keto.

---

This invention relates to novel steroid compounds having oestrogenic activity and to processes for their preparation.

Up to the present time, steroids useful in human therapy and having oestrogenic activity have been found to possess a fully aromatic ring A. On administration they are usually found to produce unwanted side effects such as nausea, epigastric distress and, in some cases, vomiting.

It has now been found that certain steroids as defined hereinafter having only either one or two double-bonds in ring A are active as pro-oestrogens, that is they are converted into oestrogens following administration to human subjects as indicated by increased urinary excretion of the oestrogen metabolities, oestrone, oestradiol and oestriol, decrease in serum phosphorus level etc. It has further been found that administration of these pro-oestrogens does not normally give rise to nausea or epigastric distress and this represents a definite advantage in therapy.

According to the present invention there are provided steroids of the cyclopentanoperhydrophenanthrene structure having either one double bond, namely in the 5(6)-position, the 5(10)-position or the 4(5)-position, or two double bonds, namely in the 1(10)- and 5(6)-positions or the 1(2)- and 4(5)-positions, the 3-position carrying a hydroxy, acyloxy or keto substitutent, the 6-position carrying a keto substituent or a hydrogen atom and a halogen, such as fluorine, hydroxy or acyloxy substituent or an oxymethylene or lactone bridge joined to the 10-position, the 10-position carrying, when saturated, a hydroxymethyl, acyloxymethyl, halomethyl or aldehydo-substituent, there being a substituent present in the 6-position when there are double bonds in the 1(10)- and 4(5)-positions, there being no oxymethylene bridge joining the 6- and 10-positions when there are double bonds in the 1(10)- and 4(5)-positions and a keto substituent in the 17-position, there being a methylene group in the 17-position when the only double bond is in the 5(6)-position, there being an halomethyl substituent in the 10-position or a methylene substituent in the 17-position when the only double bond is in the 4(5)-position.

The new pro-oestrogenic steroids according to the invention may, for example, possess one of the following partial structures in rings A and B:

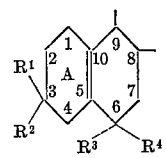

where $R^1$ is a hydroxy or acyloxy group and $R^2$ is a hydrogen atom or $R^1$ and $R^2$ together form a keto group, $R^3$ is a hydrogen atom or a $\beta$-hydroxy, $\beta$-acyloxy, $\alpha$-halogen or $\beta$-halogen such as fluorine substituent and $R^4$ is hydrogen or $R^3$ and $R^4$ together form a keto group.

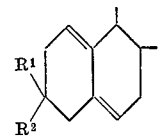

where $R^1$ and $R^2$ have the meanings given in (1) above.

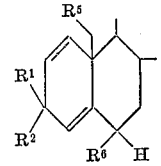

where $R^1$ and $R^2$ have the meanings given in (1) above, $R^5$ is a halogen such as iodine atom or a hydroxy or acyloxy group and $R^6$ is hydrogen or together with $R^5$ forms an oxide or lactone bridge, the broken line between the 1- and 2-positions indicating a carbon-carbon bond which may be present or absent, there being a 17-methylene substituent present when there is no 1(2) double bond, there being no oxido bridge present when there is a 1(2)-double bond and a 17-keto substituent.

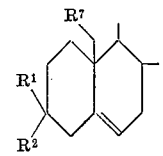

where $R^1$ and $R^2$ have the meanings given in (1) above and $R^7$ is a hydroxy, acyloxy or keto-substituent.

By the term "steroids" as used herein is meant compounds having the basic cyclopentanoperhydrophenanthrene ring structure and which may contain various substituents e.g. an alkyl group such as a methyl group in a $\alpha$- or $\beta$-configuration of the 2-, 6- or 16-position, various substituents in the $\alpha$- or $\beta$-configuration of the 17 position, e.g. a halogen atom, a keto group, a hydroxy group, a hydrocarbon group such as a methylene, ethynyl, haloethynyl, buta-1,3-diynyl or 1,5-dimethyl-hexyl group, an acyl group such as an acetyl group, an $\alpha$-hydroxyethyl group or a hydroxy-acetyl group or a ketal derivative thereof, an alkyl group in the 18-position etc.

The new compounds are, as indicated above, active as pro-oestrogens and are therefore useful in the treatment of post-menopausal syndrome, primary amenorrhea, dysmenorrhea, galactorrhea, osteoporosis and acromegaly. They possess the advantage over previously used oestrogens of producing little or no nausea, epigastric distress or vomiting on administration.

Where the steroids carry alkyl groups as substituents, these preferably possess 1–8 carbon atoms. Acyl groups are preferably lower aliphatic acyl groups having 1–6 carbon atoms such as acetyl groups, or are aroyl groups such as benzoyl.

One group of important compounds according to the invention are the 3β,6β-dihydroxy-5(10)-dehydro-steroids of partial structure I and their acyloxy derivatives. An especially useful compound on account of its activity as a pro-oestrogen and as an intermediate in the preparation of other compounds according to the invention is 3β,6β-dihydroxy-19-nor-androst-5(10)-ene-17-one.

The compounds having the partial structure III are also of importance, and especially those which possess a keto or acyloxy group at the 17-position. The substituent $R^5$ is preferably acetyloxy, or iodine or forms an oxido or lactone ring with $R^6$, 1,4-dienes are preferred. Especially useful compounds on account of their pro-oestrogenic activity include androsta-1,4-dien-17β,19-diol-3 one diacetate, 6β,19-oxido-androsta-1,4-dien-17β-ol-3-one, androsta-1,4-dien-6β-ol-3,17-dione-19-oic - 6,19-lactone, 19-iodo-17-acetoxy-androst - 4 - en - 3 - one and androsta-4-en-3,17-dione-6β-ol-19-oic-lactone.

A further especially important group of compounds according to the invention are those having a methylene group in the 17-position. Particularly useful compounds of this type include 6β,19-oxido-17-methylene-androst-4-en-3-one, 19-acyloxy-17-methylene-androst-4-en - 3 - ones such as the acetate and 3β-hydroxy-17-methylene-androst-5-en-19-al and its esters. In this group of compounds it is preferred that the C and D rings be unsubstituted but the 18-position may advantageously carry a alkyl group, that is, there may be an ethyl group in the 13-position.

According to a further feature of the invention we provide pharmaceutical compositions containing one or more compounds according to the invention together with one or more pharmaceutical carriers or excipients. The compositions may also contain the compound androsta-1,4-dien-17β,19-diol-3-one diacetate which has previously been described but not as a pro-oestrogenically active steroid. These compositions can be usefully applied in the treatment of the menopausal and postmenopausal syndromes, functional uterine bleeding, postpartum breast engorgement, female hypogonadism, accidents of pregnancy and senile vaginitis. Furthermore, the compositions act, as do other oestrogenic compounds in reducing the serum cholesterol level and hence are useful in treating the hypercholesteraemia associated with hypertension, arteriosclerosis and arteriosclerotic heart disease. Alone or in combination with progestational compounds the compositions can also be used as antifertility agents. A further advantage of the compositions are their reduced tendency to induce salt and water retention as compared with conventional oestrogens. This is of particular advantage in aged subjects having diseases associated with edema.

The compositions according to the invention may take the form of oral, parenteral, rectal or topical preparations. The preferred mode of administration is sublingually as lozenges. Other oral formulations, include, for example, tablets, capsules, dragees, and like dosage-unit forms as well as syrups, elixirs, emulsions etc. The pharmaceutical carrier or excipient may, for example, be of the kind conventional for such formulations, e.g. starch, lactose, talc, magnesium stearate etc. in tablets, dragees and lozenges, gelatin for capsules and for the liquid preparations water or oil containing suspending, emulsifying, dispensing, thickening, flavouring agents etc.

Parenteral formulations will comprise the active steroid in solution or suspension in a parenterally acceptable liquid, for example sterile water, oils such as peanut oil or ethyl oleate, oily emulsions etc.

Rectal formulations will comprise a suppository base, for example a polyglycol or carbowax base.

Topical formulations will include the active steroid in a topical base, e.g. an ointment, cream or lotion, etc., the carrier or excipient being, for example, of the kind conventional for such formulations.

The dosage unit forms of the compositions according to the invention preferably comprise 0.05 to 100 mg. of active steroid, advantageously 0.1 to 50 mg. Units containing 1.0 to 25 mg. are especially convenient.

Examples of useful dosage units are tablets for oral or sublingual administration containing 2, 5 or 25 mg. of active substance.

For the 17-methylene steroids, relatively low dosages are often effective and dosage untis containing these may have a content of 0.05 to 50 mg. active steroid, small units containing, for example, 1.0 to 10 mg. often being especially convenient.

The compounds androsta-1,4-dien-17β,19-diol-3-one diacetate, 6β,19-oxido-androsta-1,4-dien-17β-ol-3-one and 19-iodo-17-acetoxy-androst-4-en-3-one may be administered orally or sublingually at the following dosage levels, some variation being indicated depending on the nature of the condition being treated:

| | Mg. |
|---|---|
| Relief of menopausal symptoms | 5–75 |
| Senile vaginitis | 5–75 |
| Painful breast engorgement | 20–120 |
| Functional uterine bleeding | 20–120 |

The compound androsta-1,4-dien-6β-ol-3,17-dione-19-oic-6,19-lactone is preferably administered at slightly different dosage levels, as follows:

| | Mg. |
|---|---|
| Relief of menopausal symptoms | 2.5–40 |
| Senile vaginitis | 2.5–40 |
| Painful breast engorgement | 10–70 |
| Functional uterine bleeding | 10–70 |

The new compounds according to the invention may be prepared in any convenient way. Advantageously, compounds of partial structure II may be prepared from those of partial structure I in which $R_3$ is hydroxyl and $R_4$ is hydrogen by dehydration, advantageously in the presence of mineral acid preferably containing a lower carboxylic acid such as formic or acetic acid. Where a carboxylic acid is used, a 3-position hydroxyl group, where present, is generally acylated and if a free OH group is required this should be formed by hydrolysis e.g. with mineral acid.

Compounds of partial structure I in which $R_3$ is fluorine may be prepared from the corresponding compound in which $R^3$ is hydroxyl by reaction with a fluorinating agent such as hydrogen fluoride etc.

The compounds in which $R^1$ and/or $R^3$ are acyloxy groups may be prepared from the corresponding compounds in which $R^1$ and/or $R^3$ are hydroxyl groups by reaction with an acylating agent such as an anhydride, halide or azide of a carboxylic acid or a ketone, for example under conditions conventional for these reagents.

The compounds in which $R^1$ and $R^2$ and/or $R^3$ and $R^4$ represent ketonic oxygen may be prepared from the corresponding compounds in which $R^1$ and/or $R^3$ is hydroxyl by oxidation, for example using a reagent for converting a secondary alcohol to a ketone, e.g. chromic acid, for example in pyridine or acetone, Oppenauer reagents such as potassium t-butoxide and benzophenone etc.

Compounds having partial structure I in which $R^3$ and $R^4$ are both hydrogen can be obtained by reacting the corresponding compound in which $R^3$ is hydroxyl with lithium aluminium hydride in the presence of a Lewis acid, for example $BF_3$ or aluminium chloride.

Reducible groups may be attacked in this process and, for example, 17-keto-steroids are reduced to 17β-hydroxy steroids.

Where, in fact, the product of partial structure I has a 17-keto group and a 17β-hydroxy substituent is required without removal of the 6β-hydroxy group, the reduction can be effected with a metal hydride reducing agent in the absence of a Lewis acid, e.g. a borohydride in an alcohol such as methanol.

Compounds having the partial structure I in which $R^1$ and $R^3$ are both hydroxyl are thus of great importance in that they can be very readily converted by standard techniques into the related pro-oestrogens described above. These compounds may be prepared, advantageously, by reaction of a compound having the partial structure V   or   VI (where R is a hydrogen atom or an acyl group and Hal is a halogen atom) with alkali whereby the carbon atom in the 19-position is eliminated and a 5(10)-double bond introduced.

The reaction with alkali is advantageously effected under moderately vigorous conditions, i.e. using an alkali metal hydroxide such as NaOH or KOH at elevated temperature e.g. at a temperature between 40° C. and the boiling point of the reaction medium. The reaction medium is preferably aqueous but conveniently contains a water-miscible solvent for the reactants e.g. an alkanol such as methanol or ethanol.

The aldehyde of partial structure V can be prepared by reaction of a hemi-acetal or ester thereof of partial structure VI with alkali under mild reaction conditions for such a time that the aldehyde is the principal product. The alkali may, for example, be alkali metal hydroxide, carbonate etc. in aqueous or aqueous-alkanolic solution, e.g. 0.2 N alkali metal hydroxide in methanol-water 5:1 at room temperature for 10 minutes.

The hemiacetal esters of partial structure VI (R=acyl) may be prepared, for example, by reaction of a dioxide having the partial structure

VII with a source of positive acyl ions, for example, an acid, e.g. an alkanoic acid such as acetic acid, in a strong acid, e.g. a mineral acid such as perchloric acid. If the reaction mixture contains an anhydride, e.g. the anhydride of the alkanoic acid used, enhanced yields of the di-acyl derivative in which R is acyl and an acyloxy group exists in the 3-position may be obtained.

The dioxides of Formula VII may also be converted into lactones, by oxidation with an oxidising agent capable of oxidising an alcohol to a ketone, e.g. chromic acid. Since a 3-hydroxy group is formed in the reaction, this group is oxidised to a keto substituent and the 5α-halogen atom will eliminate to form a product having the structure In a closely similar way, a 6β,19-oxido steroid having the partial structure may be oxidised with a reagent able to oxidise alcohols to ketones, for example chromium trioxide, whereby a steroid having the structure is formed.

4(5)-dehydro steroids may be converted into the corresponding 1,4-dienes by dehydrogenation, for example by reaction with selenium dioxide, or a quinone dehydrogenating agent such as 2,3-dicyano-5,6-dichloro-1,4-quinone or by biological dehydrogenation using organisms such as *B. sphaericus* or *Corynecbacterium simplex*.

The dioxide of partial structure VII may, for example, be prepared by reaction of an oxime of the partial structure

VIII (where R has the above meaning) with an acid e.g. a strong mineral acid such as hydrochloric acid, advantageously in solution in an aqueous polar solvent e.g. aqueous dioxan.

The oxime of partial structure VIII may, for example, be prepared by photolysis of a compound having the partial structure (where R has the above meaning) as described in our Belgian Patent No. 625,669.

It is also possible to prepare the hemi-acetal having partial structure VI by reaction of the oxime of partial structure VIII with nitrous acid and this is generally the more convenient method. The nitrous acid may, for example, be generated in situ by reaction of a nitrite, e.g. an alkali metal nitrite, with an acid, e.g. a mineral acid such as hydrochloric or sulphuric acid or an alkanoic acid such as acetic acid.

The compounds of partial structure VII may be used also to prepare compounds of the partial structure by oxidation e.g. with chromium trioxide under conditions in which the 5α-bromine atom is eliminated to afford a 4(5)-double bond. The corresponding 1,4-diene may then be obtained e.g. by selenium dioxide oxidation etc.

Lactones of Formula III may also be obtained by oxidation of hemi-acetals of Formula VI, e.g. with chromium trioxide, followed by elimination of the 5α-halogen atom to introduce a 4(5)-double bond and dehydrogenation to form the 1,4-diene.

Where compounds having a 19-hydroxy group are required they may be obtained by reacting the corresponding 6β,19-oxide with a dissolving metal or low-valency metal ion reducing agent. The reducing agent may, for example, be zinc dust or a zinc-copper couple or zinc in the presence of an acid such as an aqueous mineral acid, for example aqueous hydrochloric, hydrobromic or sulphuric acid or, more preferably, an organic acid such as glacial or aqueous alkanoic acids such as acetic or propionic acid. Other reducing metals include tin in the presence of acid, aluminium amalgam in an aqueous medium etc. The reducing agent may also comprise a compound furnishing metal ions in a low valency state capable of being oxidised to a high valency state, for example titanous, chromous or stannous salts e.g. the chlorides.

When 19-acyloxy compounds according to the invention are required, they may be prepared from the corresponding 19-hydroxy steroids by reaction with an appropriate acylating agent such as an anhydride or acid halide of a carboxylic acid e.g. acetic or benzoic acid.

The 19-iodo steroids according to the invention may be prepared from the corresponding 19-hydroxy compounds by preliminary conversion to a reactive ester such as the toluene-p-sulphonate followed by reaction with an iodide, for example an alkali metal iodide such as sodium iodide.

Compounds having a keto substituent at the 19-position, that is an aldehyde group at the 10-position, can be produced from steroids having a 5α-halogen atom and oxide bridges between the 19 position and the 3β and 6β positions, namely a compound having the partial structure VII given above, by reaction with a low-valency metal ion or dissolving metal reducing agent e.g. zinc dust, preferably in the presence of an alkanol such as ethanol or methanol. It will be noted that the 5α-halogen atom is normally eliminated under these conditions.

Steroids having a 17-methylene substituent can be prepared from the corresponding 17-keto-steroids by reaction with a triarylphosphonium metho salt in the presence of a strong base. The reactive agent is the triarylphosphine methylene formed by elimination of a molecule of acid, e.g. HBr, on reaction of the metho salt with the base. The base may be, for example, an inorganic base such as an alkali metal hydroxide or alkoxide. The preferred type of base is the lithium alkyl, advantageously lithium butyl.

The reaction is preferably effected in an inert solvent for the reactants, for example an ether solvent such as tetrahydrofuran, dioxan, diethyl ether etc., which is preferably anhydrous. The reaction is also advantageously effected in an inert atmosphere, e.g. under nitrogen. The reaction temperature is preferably elevated, e.g. at the boiling point of the reaction medium.

For the formation of compounds according to the invention this reaction (the Wittig reaction) may be effected either on 17-keto compounds according to the invention or at some intermediate stage. Thus, for example, a 3-hydroxy - 5α - halogeno - 6β - 19 - oxido - 17 - keto-steroid may be reacted with a triarylphosphine metho salt in the presence of a strong base, followed by oxidation and elimination of hydrogen halide to yield the corresponding 3 - keto - Δ⁴ - 6β,19 - oxido - steroid which may then be converted into the corresponding 3-keto-Δ⁴-19-hydroxy steroid by zinc dust opening of the 6β,19-oxide bridge followed, if required, by acylation, e.g. acetylation. Δ⁴-Steroids may be converted into Δ¹,⁴-steroids by dehydrogenation with selenium dioxide or dicyano-dichloro-quinone. Oxidation of the 3-hydroxy group may, for example, be effected using chromium trioxide, preferably in pyridine and under these conditions hydrogen halide is eliminated to give the desired 3-keto-Δ⁴-steroid.

In order that the invention may be well understood we give the following examples by way of illustration only. The compounds in the examples are identified by reference to the following formula drawings. All temperatures are in °C.

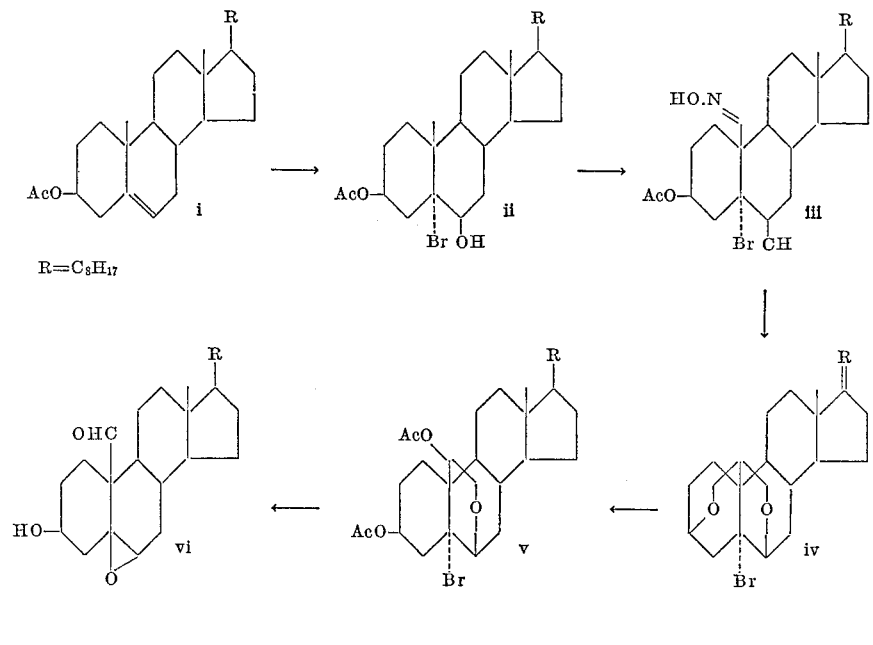

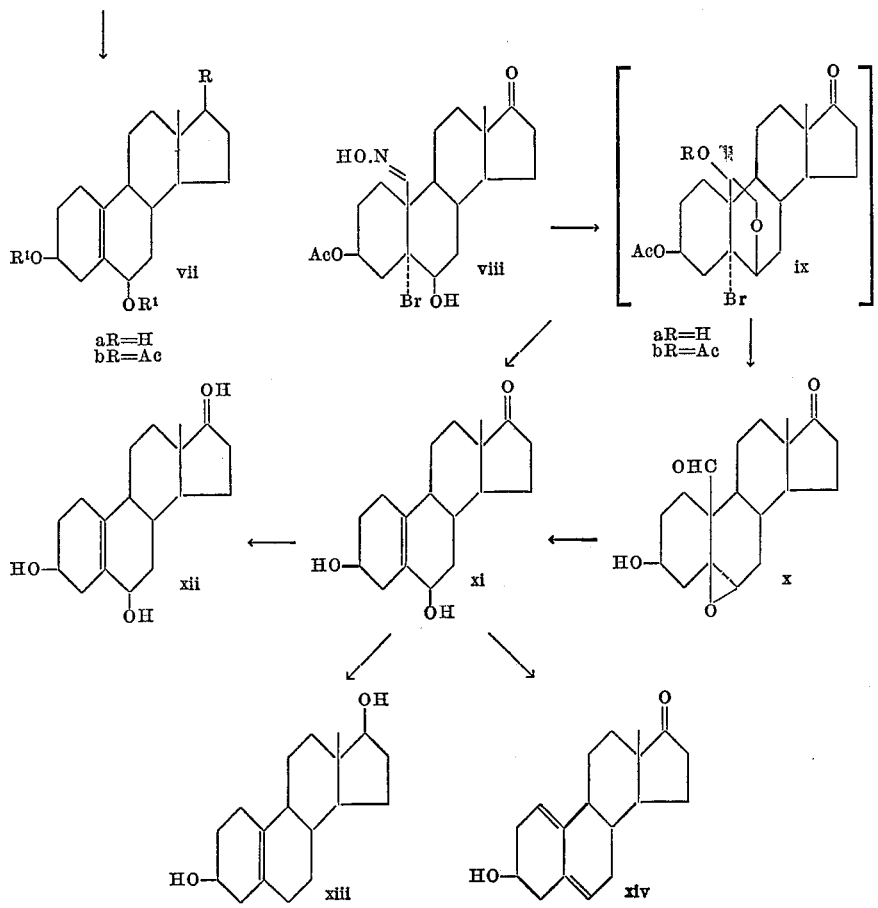

EXAMPLE 1

5α-bromo-3β,19-6β,19-diepoxycholestane(iv)

To the oxime (iii, 14 g.) in acetone (560 ml.) and dioxane (140 ml.) was added water (112 ml.) and conc. hydrochloric acid (50 ml.). The reaction mixture was heated on the steam bath under nitrogen for 3 hours. After cooling to 0° C., the crystalline dioxide (10.4 g.), M.P. 118–126°, was obtained by direct filtration. Recrystallization from ether/pet-ether gave (7.1 g.). M.P. 126–129°. The analytical sample had M.P. 131–133°, $[\alpha]_D^{22}+11°$ (c., 1.00).

Found: C, 68.15; H, 9.10; O, 6.70; Br, 16.50. $C_{25}H_{43}O_2Br$ Requires: C, 67.62; H, 9.05; O, 6.70; Br, 16.65%.

EXAMPLE 2

5α-bromo-6β-hydroxy-19-oxo-cholestane-6,19-hemiacetal 3,19-diacetate (v)

To a solution of the dioxide (iv, 1.5 g.) in acetic acid (75 ml.) and acetic anhydride (23 ml.) cooled to 10° C., was added perchloric acid (0.9 ml.), and the solution kept at this temperature for 1½ hours. The reaction mixture was poured into ice-water, extracted with methylene chloride and worked up as usual, giving, after crystallization from methanol, a mixture of stereo isomers (1.2 g.), M.P. 106–146. Careful crystallization from warm 80% acetic acid gave the diacetate, M.P. 151–154°, recrystallized from methanol M.P. 152–154°, $[\alpha]_D^{21}+20°$ (c., 1.00).

Found: C, 77.62; H, 10.36; O, 11.79. $C_{27}H_{44}O_3$ Requires: C, 77.83; H, 10.65; O, 11.52%.

EXAMPLE 3

5β,6β-epoxy-3β-hydroxy-19-oxo-cholestane (vi)

To a solution of the diacetate (v., 100 mg.) in hot methanol (5 ml.) was added sodium hydroxide (1 ml., 1 N) and the reaction mixture left at room temperature for 10 minutes. The crystalline aldehyde was obtained by filtration, and had M.P. 138–140° (75 mg.), $[\alpha]_D^{22}-31°$ (c., .94);

$\gamma_{max}^{KBr}$ 3400(s), 2750(w), 1710(va) cm.$^{-1}$

Found: C, 77.65; H, 10.35; O, 11.80. $C_{27}H_{44}O_3$ requires: C, 77.85; H, 10.65; O, 11.60%.

EXAMPLE 4

19-norcholest-5(10)-en-3β,6β-diol (viiia)

A solution of the epoxyaldehyde (vi, 150 mg.) in 5% methanolic potassium hydroxide (10 ml.) and 20% aqueous potassium hydroxide (2 ml.) was refluxed on a steam bath for 2½ hours. After being cooled, the reaction mixture was diluted with water, and extracted with methylene chloride. Work-up as usual, and crystallization from acetone gave needles, M.P. 165–168° (100 mg.), $[\alpha]_D^{23}+98°$ (c., 0.89);

$\gamma_{max}^{KBr}$ 3300(vs), 3200(shoulder) cm.$^{-1}$

EXAMPLE 5

19-norcholest-5(10)-en-3β,6β-diol diacetate (viib)

The diol (viia, 50 mg.) on acetylation with acetic anhydride and pyridine at room temperature gave the diacetate (29 mg.), M.P. 98–100°, $[\alpha]_D+80°$;

$\gamma_{max}^{KBr}$ 1760 cm.$^{-1}$

Found: C, 76.50; H, 10.25; O, 14.00. $C_{30}H_{48}O_4$ requires: C, 76.20; H, 10.25; O, 14.55%.

EXAMPLE 6

3β,6β-dihydroxy-19-norandrost-5(10)-en-17-one (xi)

The oxime (viii, 10 g.) dissolved in glacial acetic acid (200 ml.) and water (50 ml.) was heated to 70°, sodium nitrate (5 g.) added, and the reaction mixture maintained at 70° for a further 4 mins. The product was cooled to 0° C., quenched with saturated sodium chloride, extracted with methylene chloride and washed successively with saturated sodium bicarbonate solution, and water, and dried ($Na_2SO_4$). Concentration gave a mixture of the hemiacetal (ixa) and hemiacetal acetate (ixb) which was not separated but used as such.

The crude mixture was dissolved in methanol (50 ml.) and a solution of potassium hydroxide (5 g.) in water (20 ml.) and heated on a steam bath for 3 hours under nitrogen. The reaction mixture was concentrated, diluted with saline, extracted with methylene chloride, and the extracts washed with water, dried and concentrated. The resulting oil (4.4 g.) was chromatographed on magnesium silicate (200 g.) to give the diol (3.3 g.) recrystallized as needles from ethyl acetate, M.P. 136–140°. The analytical sample had M.P. 140–143°, $[\alpha]_D^{22}+192°$ (c., 1.00);

$\gamma_{max.}^{KBr}$ 3550(s), 3400(s), 1720(vs) cm.$^{-1}$

Found: C, 74.31; H, 9.15; O, 16.53. $C_{18}H_{26}O_3$ requires: C, 74.44; H, 9.02; O, 16.53%.

EXAMPLE 7

19-norandrost-5(10)-en-3β,6β,17β-triol (xii)

The diol (xi, 1 g.) was dissolved in methanol (30 ml.) and sodium borohydride (5 g.) added, and the solution stood for 1½ hours. The product was concentrated to low volume, diluted with water, extracted with methylene chloride, and the extracts washed with water and dried ($Na_2SO_4$). Evaporation gave the product (610 mg.) M.P. 179–184° and recrystallization from methanol/ethyl acetate gave the triol (450 mg.) M.P. 184–186°, $[\alpha]_D^{23}+5°$;

$\gamma_{max.}^{KBr}$ 3550(inflexion), 3460(vs) cm.$^{-1}$

Found: C, 74.03; H, 9.71; O, 16.38. $C_{18}H_{28}O_3$ requires: C, 73.93; H, 9.65; O, 16.41.

EXAMPLE 8

19-norandrost-5(10)-en-3β,17β-diol (xiii)

The diol (xi, 1 g.) was dissolved in dry tetrahydrofuran (50 ml.) containing lithium aluminium hydride (2.5 g.) and anhydrous aluminum chloride (1.5 g.), and the mixture heated under reflux overnight with stirring. Excess lithium aluminium hydride was decomposed with ethyl acetate, the mixture diluted with 10% hydrochloric acid, extracted with ethyl acetate, and the extracts washed until neutral and dried ($Na_2SO_4$). Concentration gave a pale yellow oil, which readily crystallized M.P. 133–145°. The diol was recrystallized from ethyl acetate as needles M.P. 143–145°, $[\alpha]_D^{22}-103°$ (c. 1.00); (Lit. M.P. 143–144° $[\alpha]_D+107°$). (Lit.[3] M.P. 207–208° $[\alpha]_D^{26}+122.5°$.)

EXAMPLE 9

19-norandrost-1(10),5-dien-3β-ol-17-one (xiv)

The diol (xi, 3.5 g.) was dissolved in formic acid (350 ml.) and heated at 60° for 10 minutes. The solution was poured into saturated aqueous sodium chloride, extracted with methylene chloride, the organic layer washed with water until neutral, dried and concentrated. The resulting oil ($\gamma_{max}$ 1740 cm.$^{-1}$ formate) was dissolved in methanol (175 ml.) and aqueous sodium hydroxide (175 ml. 10% solution) and kept for 1 hour at room temperature. The product was diluted with water and worked up as usual to give the diene, M.P. 134–146°, recrystallized from acetone/hexane as needles, M.P. 144–147° (2.3 g.) $[\alpha]_D^{23}-101°$;

$\gamma_{max.}^{KBr}$ 3630, 1740(vs) cm.$^{-1}$; $\lambda_{max.}^{EtOH}$ 236mµ ($\epsilon$ 17,000)

Found: C, 79.43; H, 8.90; O, 11.67. $C_{18}H_{24}O_2$ requires: C, 79.34; H, 8.88; O, 11.75%.

EXAMPLE 10

5α-bromo-6β,19-oxido-17-methylene-androstan-3β-ol

A suspension of triphenylmethylphosphonium bromide (37.5 g., 0.11 mole) in anhydrous ether (2.1.) was treated with n-butyl lithium (15% w./v. in hexane; 87 ml.) under nitrogen and stirred for 2 hrs. at room temperature. A solution of 5α-bromo-6β,19-oxido-androstan-3β-ol-17-one (10 g.) in tetrahydrofuran (100 ml.) was added and stirring continued for 4 hrs. before allowing the mixture to stand overnight. Ether was distilled off whilst adding dry tetrahydrofuran until almost all the ether had been replaced. The mixture was then refluxed for 6 hrs., cooled, diluted with water, ether extracted and worked up as usual. Chromatography of the product through acid-washed alumina (1 kg.) gave, from elution with 1% methanolic —$CH_2Cl_2$, crystals of 5α-bromo-6β,19-oxido-17-methylene-androstan-3β-ol (5.24 g.) M.P. 182–6°. The analytical sample had M.P. 182–6°; $[\alpha]_D^{25}+3.46°$ (c., 1.1).

$C_{20}H_{29}BrO$ requires: C, 63.03; H, 7.66; Br, 20.95; O, 8.40%. Found: C, 62.89; H, 7.65; Br. 21.20; O, 8.51.

EXAMPLE 11

6β,19-oxido-17-methylene-androst-4-en-3-one

The bromo-ether from Example 10 (1.0 g., 3.0 m. mole) was dissolved in pyridine (50 ml.) at room temperature, added to $CrO_3$-pyridine complex—from $CrO_3$ (1.04 g.) and pyridine (50 ml.)—and left for 16 hours. The brown solution was poured into water (300 ml.) containing sodium bicarbonate (2.1 g.) and extracted with ether. The extract, after workup, gave a crystallizing oil that was further purified by chromatographing through neutral alumina (30 g., grade III). Elution with methylene chloride gave needles of the desired enone (0.44 g., 57%), M.P. 126–9°. An analytical sample, from methanol as needles, had M.P. 127–9°, $[\alpha]_D^{25}-916°$ (c., 1.4);

$\lambda_{max.}^{MeOH}$ 239 ($\epsilon$ 12,600); $\gamma_{max.}^{Nujol}$ 1670(s), 870(s) cm.$^{-1}$ Found: C, 80.52; H, 8.70; O, 10.69. $C_{20}H_{26}O_2$ requires: C, 80.50; H, 8.79; O, 10.73%.

EXAMPLE 12

19-acetoxy-17-methylene-androst-4-en-3-one

The enone ether from Example 11 (0.914 g., 3.1 m. mole) in ethanol (14 ml.) and methylene chloride (8 ml.) was treated with zinc dust (8.4 g.) with stirring at reflux for 20 hrs. The mixture was filtered from zinc residues, poured into water, and methylene chloride extracted. Working up of the extract afforded a colorless oil which was filtrated through neutral alumina 10 g., grade III) eluting with methylene chloride. The crude alcohol fraction (0.824 g.) was dissolved in pyridine (16 ml.) and acetic anhydride (5 ml.) added. After 46 hours, at room temperature, the mixture was worked up and the crude product chromatographed through neutral alumina (30 g., grade III). Elution with benzene-methylene chloride 1:1 afforded an oil that crystallized, after standing under petroleum ether for two days, as fine needles of the desired 19-acetate (0.362 g., 35%), M.P. 107–9°. Recrystallization from methanol-water 2:1 gave a sample of M.P. 110–111°, $[\alpha]_D^{25}+175.8°$ (c., 1.35);

$\lambda_{max.}^{MeOH}$ 237.5 mµ ($\epsilon$ 16,800); $\gamma_{max.}^{Nujol}$ 1730(s), 1665(s), 1215(s), and 870(m) cm.$^{-1}$ Found: C, 77.13; H, 8.72; O, 14.12. $C_{22}H_{30}O_3$ requires: C, 77.21; H, 8.82; O, 14.01%

EXAMPLE 13

Preparation of 5α-bromo-3β, 19:6β, 19-dioxido-17-methylene-androstane

A suspension of triphenylmethylphosphonium bromide (4.32 g.) in ether (100 ml.) was treated with n-buytl lithium (10.02 ml., 15% w./v. in hexane) under nitrogen and stirred vigorously for 2 hours. A solution of 5α-bromo-3β,19,6β,19-dioxido-androstan-17-one (1.134 g.) in anhydrous ether (200 ml.) was added and the mixture stirred overnight. The ether was distilled off while anhydrous tetrahydrofuran was distilled into the reaction flask until the temperature reached 60°. At this point refluxing was continued for 6 hrs. The mixture was cooled, diluted with water and extracted with ether. Working up gave a gum that was immediately chromatographed through acid washed alumina (100 g.) to give, from methylene chloridebenzene (1:3) the desired 17-methylene compound (0.34 g.) M.P. 166–9°.

EXAMPLE 14

The ether produced in Example 13 (0.512 g.) in methylene chloride (4 ml.) and ethanol (8 ml.) was stirred with zinc dust (5 g.) for 48 hrs. whilst heating to reflux. The mixture was cooled, filtered-washed with methylene chloride (25 ml.), evaporated to dryness in vacuo, redissolved in methylene chloride (20 ml.), and washed with water. Working up afforded a colorless oil. Chromatography through neutral alumina (10 g., grade IV) gave, with 0.2% methanolic $CH_2Cl_2$ and after crystallization from aqueous methanol (1:2), needles of 3β-hydroxy-17-methylene-androst-5-en-19-al (137 mg.) M.P. 121–3°, $[\alpha]_D^{24}$ −74.5° (c., 1.1).

Found: C, 79.85; H, 9.27; O, 10.80. $C_{20}H_{28}O_2$ requires: C, 79.95; H, 9.40; O, 10.65%.

EXAMPLE 15

The ether from Example 11 (0.10 g.) was dissolved in benzene (10 ml.) and 2,3-dicyano-5,6-dichloro-1,4-quinone (0.098 g. freshly recrystallized; 1.3 equivalents) added. The mixture was stirred under nitrogen with gentle refluxing for 40 hours. The mixture was then cooled and more benzene added (10 ml.). The solution was extracted with 2 N sodium hydroxide (5 mg.), $Na_2SO_3$ solution, (ca. 1 N; 5 ml.), 2 N sodium hydroxide (5 ml.), and water (3× 5 ml.) before drying ($Na_2SO_4$) and working up as usual. The product crystallized from aqueous methanol as off-white prisms of 6β,19-oxido-17-methylene-androst-1,4-dien-3-one (38.9 mg.; 40%), M.P. 119–121°;

$\gamma_{max.}^{Nujol}$ 1680 and 1645 cm.$^{-1}$

EXAMPLE 16

5α-bromo-3β,19: 6β,19-dioxido-androstan-17-one (250 mg.) in acetic-acid (5 ml.) was treated with Jones-Weedon reagent (Chromium trioxide in acetone/sulphuric acid) (2 ml.) and stood at room temperature for 70 hours. After pouring into water and extracting with methylene chloride, the product was chromatographed through acid-washed alumina in benzene. Elution with benzene afforded dioxide starting material (33 mg.). Further elution with methylene chloride-benzene mixture gave 6β-hydroxy-androst-1,4-diene-3,17-dione-19-oic lactone (40 mg.) which on recrystallization gave colourless needles (17 mg.), M.P. 289–292°. Identical to authentic material in its infrared spectrum.

EXAMPLE 17

19-iodo-17-acetoxyandrost-4-en-3-one 19-hydroxy-17-acetoxy-androst-4-en-3-one toluene-p-sulphonate (700 mg.) was heated under reflux with sodium iodide (3 g.) in cyclopentanone for 2 hours. The reaction mixture was cooled, poured into saline and extracted with methylene chloride, washed and dried ($MgSO_4$). The product (590 mg.) was chromatographed on magnesium silicate (10 g.) and elution with methanol:methylene chloride (1:20) gave the desired iodide (490 mg.) crystallized from ethanol, M.P., 166–168°

$[\alpha]_D^{22}$ +45.6°

Found: C, 55.17; H, 6.41; O, 10.65; I, 27.65%. $C_{21}H_{29}O_3I$ requires: C, 55.27; H, 6.36; O, 10.53; I, 27.84%.

EXAMPLE 18

Δ$^1$-19-hydroxy-testosterone-17,19 diacetate

A mixture of 19-hydroxy testosterone diacetate (2 g.) selenium dioxide (sublimed) (630 mg.) and glacial acetic acid (2.2 ml.) in t-butanol (220 ml.) was refluxed for 20 hours. More selenium dioxide (630 mg.) was added and refluxing was continued for 9 hours. The reaction mixture was allowed to stand for 15 hours, then was diluted with ethyl acetate and filtered through diatomaceous earth. The filtrate was evaporated to dryness in vacuo, and the residue was taken up in ethyl acetate and washed successively with saturated aqueous sodium bicarbonate water, ammonium sulphide (twice), aqueous sodium hydroxide, 1 N hydrochloric acid and water until neutral, dried, and evaporated. The residue was crystallized from acetone-hexane to give the desired Δ$^1$ compound (1.6 g.), M.P. 167–170° C.

$\gamma_{max.}^{KBr}$ 1740, 1675, 1640, 1620 (shoulder) cm.$^{-1}$

An analytical sample is being prepared.

EXAMPLE 19

17β-acetoxy-6,19-oxido-androst-1,4-diene-3 one

A mixture of 17β-acetoxy-6,19-oxido-androst-4-ene-3 one (1 g.), selenium dioxide (sublimed) (315 mg.) and glacial acetic acid (1.1 ml.) in t-butanol (110 ml.) was refluxed for 20 hours, when selenium dioxide (15 mg.) was added, then refluxed for 9 hours. Work up as above and crystallization from $CH_3OH$ gave the desired Δ$^1$ compound (580 mg.), M.P. 182–184° C. $[\alpha]^{23.5°}$ +26° ($CHCl_3$; c.=0.998), $\gamma_{max.}^{KBr}$ 1740, 1680, 1650, 1610 (shoulder) 1500 cm.$^{-1}$
$\lambda_{max.}^{CH_3OH}$ 243 mμ, ε=11,000

An analytical sample is being prepared.

Calculated for $C_{21}H_{24}O_4$: C=73.66, H=7.65, O=18.69. Found: C=71.84, H=7.44, O=18.79.

EXAMPLE 20

6β-hydroxy-androst-1,4 diene-3,17-dione-19-oic lactone

A mixture of 6β-hydroxy-androst-4-ene-3,17-dione-19-oic lactone (700 mg.), selenium dioxide (sublimed) (270 mg.) and glacial acetic acid (0.9 ml.) in t-butanol (90 ml.) was refluxed for 20 hours. More selenium dioxide (270 mg.) was added, and refluxing was continued for 9 hours. Work up as in the previous example gave a residue which was dissolved in methylenechloride-benzene (3:1) and chromatographed on magnesium silicate (14 g.), eluting with methylene chloride containing increasing amounts of methanol. The less polar fractions were combined and crystallized from acetone-hexane to give the desired Δ$^1$ compound (170 mg.), M.P. 252–255.5° C. (d.); $[\alpha]_D^{23.5°}$ +3.8° ($CHCl_3$; c.=1.01);

$\gamma_{max.}^{KBr}$ 1780, 1740, 1690, 1650, 1610 (weak) cm.$^{-1}$. $\lambda_{max.}^{CH_3OH}$ 246 mμ, ε=11,400

An analytical sample is being prepared.

Calculated for $C_{19}H_{20}O_4$: C=73.06, H=6.75, O=20.49%. Found: C=73.10, H=6.58, O=20.13.

EXAMPLE 21

19-hydroxy-17β-acetoxy-androst-4-en-3-one toluene-p-sulphonate 19-hydroxy-17-acetoxy-androst-4-en-3-one (1.53 g.) was mixed with toluene-p-sulphonyl chloride (recrystallized; 5.0 g.) and pyridine (40 ml.) and allowed to stand for 44 hours. After 60 hours the solution was poured into saline and extracted with methylene chloride. After washing with water the solvent was removed at 25° to furnish an oil which was triturated with methanol. Filtration and recrystallization from hexane gave the tosylate, M.P. 171–2° from hexane-methylene chloride, 1.43 g. $[\alpha]_D^{28}+99°$ (c., 0.12 in $CHCl_3$), $\lambda_{max.}$ 1620, 1670, 1740 cm.$^{-1}$ plus aromatic bands.

I claim:
1. A compound of one of the formulae

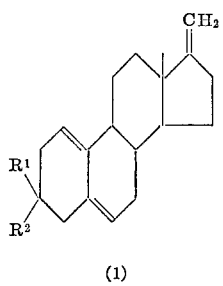
(I)

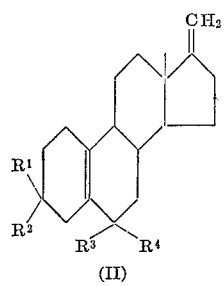
(II)

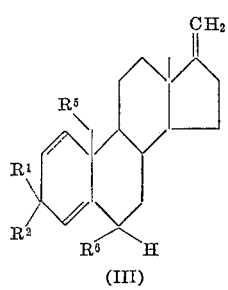
(III)

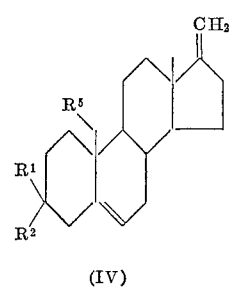
(IV)

wherein $R^1$ and $R^2$=OH and H, lower acyloxy and H or oxo; $R^3$=H, F, OH or lower acyloxy; $R^4$=H or together with $R^3$=oxo; $R^5$=OH, lower acyloxy, I or oxo; $R^6$=H, F, OH, lower acyloxy or together with $R^5$=oxymethylene or lactone bridge, and—indicates that a 1(2)-double bond may be present.

2. A steroid as claimed in Formula IV of claim 1 wherein $R^1$ and $R^2$ are as therein defined and $R^5$ is OH, lower acyloxy or oxo.

3. A compound of the formula

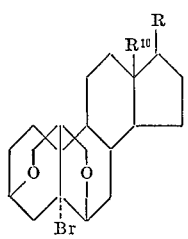

wherein R is oxo, methylene, β-hydroxy, β-acetoxy or β-alkyl of the formula $C_8H_{17}$ and $R^{10}$ is methyl.

4. A compound selected from the group consisting of 6β,19 - oxido - 17 - methylene - androst - 4 - en - 3 - one and 6β,19 - oxido - 17 - methylene - androst - 1,4 - diene-3-one.

5. A process for the preparation of a steroid having in the A and B rings the structure

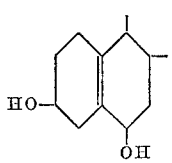

comprising reacting a steroid having in the A and B rings the structure

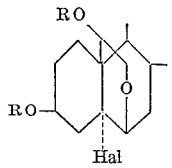

with alkali at room temperature to produce a steroid having in the A and B rings the structure

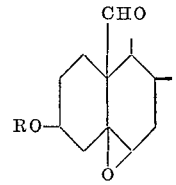

and reacting said last-mentioned steroid with alkali at a temperature between 40° C. and the boiling point of the reaction mixture, R being a hydrogen atom or an acyl group and Hal being a halogen atom.

6. A process for the preparation of a steroid having in the A and B rings the structure

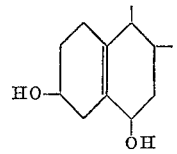

comprising reacting a steroid having in the A and B rings the structure

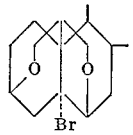

with a lower alkanoic acid and a mineral acid to produce a steroid having in the A and B rings structure

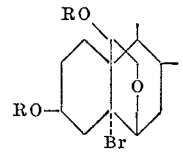

reacting said last-mentioned steroid with alkali at room temperature to produce a steroid having in the A and B rings the structure

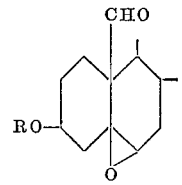

and reacting said last-mentioned steroid with alkali at a temperature between 40° C. and the boiling point of the reaction mixture, R being a hydrogen atom or an acyl group.

7. The process of claim 6 in which the mineral acid is perchloric acid.

8. A process for the preparation of a steroid having in the A and B rings the structure

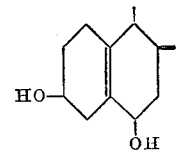

comprising reacting a steroid having in the A and B rings the structure

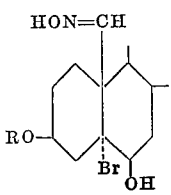

with a mineral acid to produce a steroid having in the A and B rings the structure

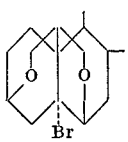

reacting said last-mentioned steroid with a lower alkanoic acid and a mineral acid to produce a steroid having in the A and B rings the structure

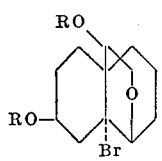

reacting said last-mentioned steroid with alkali at room temperature to produce a steroid having in the A and B rings the structure

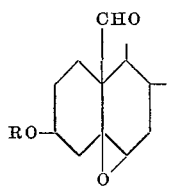

and reacting said last-mentioned steroid with alkali at a temperature between 40° C. and the boiling point of the reaction mixture, R being a hydrogen atom or an acyl group.

9. A process for the preparation of a steroid having in the A and B rings the structure

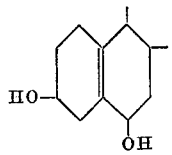

comprising reacting a steroid having in the A and B rings the structure

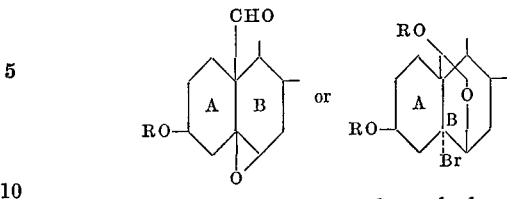

where R is a hydrogen atom or a lower hydrocarbon acyl group with alkali at a temperature between 40° C. and the boiling point of the reaction medium whereby the carbon atom in the 19-position is eliminated and a 5(10) double bond is introduced.

References Cited

UNITED STATES PATENTS

| | | | |
|---|---|---|---|
| 2,705,721 | 4/1955 | Nysted | 260—397.5 |
| 3,001,989 | 9/1961 | Ringold et al. | 260—239.55 |
| 3,036,068 | 4/1962 | Ringold et al. | 260—239.57 |
| 3,056,807 | 10/1962 | Ayer | 260—397.3 |
| 3,101,356 | 8/1963 | Bowers | 260—397.4 |
| 3,101,357 | 8/1963 | Bowers | 260—397.4 |
| 3,141,016 | 7/1964 | Wettstein et al. | 260—239.55 |
| 3,170,934 | 2/1965 | Wettstein et al. | 260—397.1 |
| 3,201,428 | 8/1965 | Bowers et al. | 260—397.4 |
| 3,206,460 | 9/1965 | Bowers | 260—239.55 |
| 3,211,761 | 10/1965 | Wettstein et al. | 260—397.4 |
| 3,246,014 | 4/1966 | Jung et al. | 260—343.2 |
| 3,258,472 | 6/1966 | Bowers et al. | 260—397.4 |
| 3,275,665 | 9/1966 | Ziegler et al. | 260—397.5 |

FOREIGN PATENTS 820,780   9/1959   Great Britain.

OTHER REFERENCES

Barton et al., J. Amer. Chem. Soc., 83, pp. 4076–4083 (1961).
Fieser et al. Steroids. N.Y., Reinhold, 1959, p. 471.
Kupchan et al., J. Amer. Chem. Soc., 84, pp. 1752–1753 (1962).
Sondheimer et al., J. Amer. Chem. Soc., 79, pp. 5029–5033 (1957).

LEWIS GOTTS, Primary Examiner

ETHEL G. LOVE, Assistant Examiner

U.S. Cl. X.R.

195—51; 260—239.57, 397.4, 397.5, 999